No. 739,324. PATENTED SEPT. 22, 1903.
J. KOENIG.
FISH NET FLOAT.
APPLICATION FILED MAR. 16, 1903.
NO MODEL.
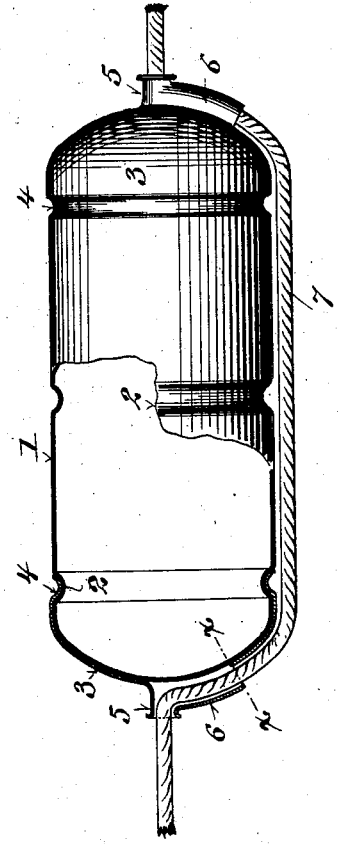
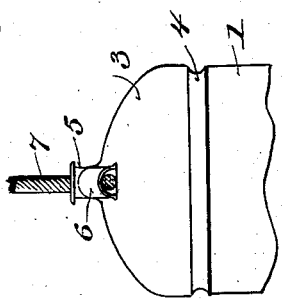
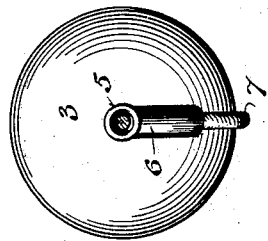
Witnesses:
Geo. W. Young.
John Hoth.
Inventor
Joseph Koenig
By H. G. Underwood
Attorneys No. 739,324. Patented September 22, 1903.

UNITED STATES PATENT OFFICE.

JOSEPH KOENIG, OF TWO RIVERS, WISCONSIN, ASSIGNOR TO ALUMINUM MANUFACTURING COMPANY, OF TWO RIVERS, WISCONSIN.

FISH-NET FLOAT.

SPECIFICATION forming part of Letters Patent No. 739,324, dated September 22, 1903.

Application filed March 16, 1903. Serial No. 147,899. (No model.)

*To all whom it may concern:*

Be it known that I, JOSEPH KOENIG, a citizen of the United States, and a resident of Two Rivers, in the county of Manitowoc and State of Wisconsin, have invented certain new and useful Improvements in Fish-Net Floats; and I do hereby declare that the following is a full, clear, and exact description thereof.

My invention has especial reference to floats for fish-nets; and it consists in certain peculiarities of construction and combination of parts, as will be fully set forth hereinafter in connection with the accompanying drawings and subsequently claimed.

In the said drawings, Figure 1 is a plan view of my improved device, partly broken away to better illustrate certain details of construction. Fig. 2 is an end view of one of the caps with the cord in place. Fig. 3 is a view showing the cap in place on the float turned one-quarter around from the position shown in Fig. 1. Fig. 4 is a detail view taken on the line x x in Fig. 1.

Referring by numerals to the drawings, 1 represents the float proper, consisting, primarily, of a hollow seamless wholly-closed cylindrical shell of aluminium or other suitable material, which is formed with a series of circumferential grooves 2 2, one adjacent to each end thereof.

3 3 represent caps, preferably spun out of like material as that of the float and shaped to snap over and closely fit the ends of the latter, said caps having like circumferential grooves 4, which rest with the described end grooves 2 of the float, and thus keep the caps in place. These caps 3 are further formed with central end tubes 5 and with short convex beads 6 struck or pressed up from the metal of the caps and open at the outer ends, the inner ends of the beads communicating with the said end tubes 5, the described end tubes and beads being for the purpose of threading a cord 7 therethrough, whereby the float may be readily attached to a fish-net.

My devices are very convenient and effective and may be made at moderate cost.

Having thus described my invention, what I claim as new, and desire to secure by Letters Patent, is—

1. A fish-net float, comprising a hollow seamless wholly-closed shell, in combination with removable cord-holding end caps, surrounding the exterior of the said shell.

2. A fish-net float, comprising a hollow seamless wholly-closed cylindrical shell, in combination with removable end caps, formed with end tubes and communicating open beads, said end caps fitting closely on said float, and carrying cords for attachment to a net.

3. A fish-net float, comprising a hollow seamless wholly-closed shell, formed with circumferential grooves, one adjacent to each end thereof, in combination with removable cord-holding end caps having like circumferential grooves for engagement with those in said shell.

In testimony that I claim the foregoing I have hereunto set my hand, at Two Rivers, in the county of Manitowoc and State of Wisconsin, in the presence of two witnesses.

JOSEPH KOENIG.

Witnesses:
W. J. WRIETH,
G. A. MAGEE.